(12) United States Patent
Bauchot et al.

(10) Patent No.: US 8,228,171 B2
(45) Date of Patent: Jul. 24, 2012

(54) METHODS AND SYSTEMS FOR RFID TAG GEOGRAPHICAL LOCATION USING BEACON TAGS AND LISTENING TAGS

(75) Inventors: Frederic Bauchot, Saint-Jeannet (FR); Jean-Yves Clement, Saint-Jeannet (FR); Gerard Marmigere, Drap (FR); Joaquin Picon, St Laurent du Var (FR); Xavier Rey-Robert, La Gaude (FR); Vincent Tassy, Cagnes sur mer (FR)

(73) Assignee: International Business Machines Corporation, Armonk, NY (US)

( * ) Notice: Subject to any disclaimer, the term of this patent is extended or adjusted under 35 U.S.C. 154(b) by 887 days.

(21) Appl. No.: 12/234,772

(22) Filed: Sep. 22, 2008

(65) Prior Publication Data

US 2009/0315685 A1 Dec. 24, 2009

(30) Foreign Application Priority Data

Jun. 20, 2008 (EP) .................................... 08305292

(51) Int. Cl.
*H04Q 5/22* (2006.01)
(52) U.S. Cl. ...... 340/10.1; 340/5.92; 340/8.1; 340/10.4; 340/572.1; 700/226; 235/385
(58) Field of Classification Search ................. 340/10.1, 340/10.41, 572.1, 5.92, 8.1; 342/387, 463–465; 700/226; 235/385
See application file for complete search history.

(56) References Cited

U.S. PATENT DOCUMENTS

| | | |
|---|---|---|
| 4,237,536 A | 12/1980 | Enelow et al. |
| 4,441,288 A | 4/1984 | Feldman et al. |
| 4,614,945 A | 9/1986 | Brunius et al. |
| 4,625,473 A | 12/1986 | Peterson et al. |
| 5,111,184 A | 5/1992 | Heaton et al. |
| 5,512,879 A | 4/1996 | Stokes |

(Continued)

FOREIGN PATENT DOCUMENTS

JP 2001205387 7/2001

(Continued)

OTHER PUBLICATIONS

Notice of Allowance dated Aug. 15, 2011, for U.S. Appl. No. 12/180,664, "Location Localization Method and System"; pp. 1-5.

(Continued)

*Primary Examiner* — George Bugg
*Assistant Examiner* — Sisay Yacob
(74) *Attorney, Agent, or Firm* — Cantor Colburn LLP

(57) ABSTRACT

RFID method and system are provided. A reader transmits a reader signal to beacon tags and a listening tag. The beacon tags transmit beacon signals including a beacon identification and a beacon distance to the reader. The listening tag receives the beacon signals. Neighbor distances are calculated for the beacon tags based on when the beacon signals are received, when the listening tag receives the reader signal, and a constant processing time. The neighbor distances are the individual distances from the listening tag to the beacon tags. A list is stored including the beacon identification for the beacon tags, the beacon distance, and the neighbor distances. The listening tag transmits the list and a listening tag identification to the reader. A geographical position of the listening tag is calculated based on the beacon distance, beacon coordinates, and a listening tag distance which is from the reader to the listening tag.

20 Claims, 11 Drawing Sheets

U.S. PATENT DOCUMENTS

| | | | |
|---|---|---|---|
| 5,521,601 A | 5/1996 | Kandlur et al. | |
| 5,528,222 A | 6/1996 | Moskowitz et al. | |
| 5,541,577 A | 7/1996 | Cooper et al. | |
| 5,646,592 A | 7/1997 | Tuttle | |
| 5,774,876 A | 6/1998 | Woolley et al. | |
| 5,804,810 A | 9/1998 | Woolley et al. | |
| 5,825,298 A | 10/1998 | Walter | |
| 5,959,568 A | 9/1999 | Woolley | |
| 6,025,780 A | 2/2000 | Bowers et al. | |
| 6,031,457 A | 2/2000 | Bonkowski et al. | |
| 6,104,337 A | 8/2000 | Coutts et al. | |
| 6,137,413 A | 10/2000 | Ryan, Jr. | |
| 6,255,959 B1 | 7/2001 | Lake et al. | |
| 6,271,753 B1 | 8/2001 | Shukla | |
| 6,275,157 B1 | 8/2001 | Mays et al. | |
| 6,424,264 B1 | 7/2002 | Giraldin et al. | |
| 6,515,591 B2 | 2/2003 | Lake et al. | |
| 6,662,642 B2 | 12/2003 | Breed et al. | |
| 6,720,866 B1 | 4/2004 | Sorrells et al. | |
| 6,844,816 B1 | 1/2005 | Melton et al. | |
| 6,882,284 B2 | 4/2005 | Lake et al. | |
| 6,960,999 B2 | 11/2005 | Haimovitch et al. | |
| 7,042,357 B2 | 5/2006 | Girvin et al. | |
| 7,081,820 B2 | 7/2006 | Minarovic | |
| 7,098,794 B2 | 8/2006 | Lindsay et al. | |
| 7,119,690 B2 | 10/2006 | Lerch et al. | |
| 7,151,455 B2 | 12/2006 | Lindsay et al. | |
| 7,170,412 B2 | 1/2007 | Knox et al. | |
| 7,176,796 B2 | 2/2007 | Chen et al. | |
| 7,382,262 B2 | 6/2008 | Commagnac et al. | |
| 7,382,266 B2 | 6/2008 | Minarovic | |
| 7,383,053 B2 | 6/2008 | Kent et al. | |
| 7,791,484 B2 | 9/2010 | Commagnac et al. | |
| 7,812,719 B2 | 10/2010 | Djuric et al. | |
| 7,962,150 B2 | 6/2011 | Hertzog et al. | |
| 2001/0008390 A1 | 7/2001 | Berquist et al. | |
| 2002/0073915 A1 | 6/2002 | Howard | |
| 2002/0109607 A1 | 8/2002 | Cumeralto et al. | |
| 2003/0099158 A1 | 5/2003 | De la Huerga | |
| 2003/0234193 A1 | 12/2003 | Clouse | |
| 2003/0234293 A1 | 12/2003 | Sauve et al. | |
| 2004/0066296 A1 | 4/2004 | Atherton | |
| 2004/0108954 A1* | 6/2004 | Richley et al. | 342/387 |
| 2004/0212480 A1 | 10/2004 | Carrender et al. | |
| 2005/0068169 A1 | 3/2005 | Copley et al. | |
| 2005/0092072 A1 | 5/2005 | Wollenberg et al. | |
| 2005/0093702 A1 | 5/2005 | Twitchell | |
| 2006/0066444 A1 | 3/2006 | Steeves | |
| 2006/0092072 A1 | 5/2006 | Steiner | |
| 2006/0111123 A1 | 5/2006 | Nerat | |
| 2006/0162207 A1 | 7/2006 | Morton et al. | |
| 2006/0208887 A1 | 9/2006 | Fields et al. | |
| 2006/0220955 A1 | 10/2006 | Hamilton | |
| 2006/0238341 A1 | 10/2006 | Commagnac et al. | |
| 2007/0001809 A1 | 1/2007 | Kodukula et al. | |
| 2007/0013541 A1 | 1/2007 | Harazin et al. | |
| 2007/0052539 A1 | 3/2007 | Brown | |
| 2007/0080783 A1 | 4/2007 | Ghosh et al. | |
| 2007/0115125 A1 | 5/2007 | Lyon et al. | |
| 2007/0126579 A1 | 6/2007 | Adams et al. | |
| 2007/0126583 A1 | 6/2007 | Maniwa et al. | |
| 2007/0247366 A1* | 10/2007 | Smith et al. | 342/464 |
| 2007/0285245 A1* | 12/2007 | Djuric et al. | 340/572.1 |
| 2007/0288995 A1 | 12/2007 | Terada et al. | |
| 2007/0290924 A1* | 12/2007 | McCoy | 342/464 |
| 2008/0061939 A1 | 3/2008 | Davis et al. | |
| 2008/0211676 A1 | 9/2008 | Commagnac et al. | |
| 2008/0261615 A1 | 10/2008 | Kalhan | |
| 2009/0160603 A1 | 6/2009 | Bauchot et al. | |
| 2009/0160622 A1 | 6/2009 | Bauchot et al. | |
| 2009/0201154 A1 | 8/2009 | Bauchot et al. | |
| 2009/0315679 A1 | 12/2009 | Bauchot et al. | |

FOREIGN PATENT DOCUMENTS

| | | | |
|---|---|---|---|
| JP | 20019205387 | | 7/2001 |
| JP | 2003141649 | A | 5/2003 |
| KR | 20030067372 | A | 8/2003 |
| KR | 20050116587 | A | 12/2005 |
| WO | WO0077344 | A1 | 12/2000 |
| WO | WO0106444 | A1 | 1/2001 |
| WO | WO02077939 | A1 | 10/2002 |
| WO | WO2006105381 | A1 | 10/2006 |
| WO | 2007006085 | A1 | 1/2007 |
| WO | WO2007002941 | A2 | 1/2007 |
| WO | WO2007006085 | A1 | 1/2007 |
| WO | 2007041153 | A1 | 4/2007 |
| WO | 2007060619 | A1 | 5/2007 |
| WO | 2007064747 | A1 | 6/2007 |

OTHER PUBLICATIONS

Abstract of JP2006309592, "Radio Rag and Its Proximity Status Detection Method", Publication Date: Sep. 11, 2006; pp. 1-12 (includes Japanese version).

Abstract of KR 1020040018301, "System for Real-Time Location of People in a Fixed Environment,"; Publication date: Mar. 3, 2004; pp. 1-2; Applicant: Safetzone Technologies Corporation.

Abstract of KR 20070013040(A), "System and Method for Group Location Searching and Messaging Using RFID", Publication Date: Jan. 24, 2007; pp. 1-13(include Korean Application).

V. Pillai, et al., "Using Volatile State Storage for Substantial Improvement in RFID Throughput", Internec Technologies; Downloaded on Oct. 6, 2008 at 2:46pm from IEEE Xplore; pp. 1-5.

M. O'Connor. "Aethon Adds RFID to Robotic Hospital Helpers", RFID Journal; May 22, 2007, pp. 1-3, http://www.rfidjournal.com/article/articleview/3330/1/1/; [retrieved on Feb. 25, 2008].

D. Wang, et al., "A Novel Solution to the Reader Collision Problem in RFID System", 2006 IEEE; School of Electronics Engineering and Computer Science Peking University Beijign P.R. China; pp. 1-4.

Abstract of CA2417616 (A1) Jul. 27, 2001, "Material and Construction for a Tamper Indicating Radio Frequency Identification Label", 3 pages.

Abstract of CN111891 (A)—Mar. 20, 1996; "Radio Frequency Circuit and Memory in Thin Flexible Package", 1 page.

Abstract of WO20050270079 (A)—Mar. 24, 2005; "A Seal", 1 page.

Response dated Feb. 1, 2010 to Office Action (Mail Date Jan. 13, 2010) for U.S. Appl. No. 12/109,319, filed Apr. 24, 2008.

Amendment dated Feb. 15, 2008 in response to Notice of Allowance (Mail Date Feb. 4, 2008) for U.S. Appl. No. 11/406,911, filed Apr. 19, 2006; Confirmation No. 7351.

Response dated Nov. 5, 2007 to Office Action (Mailed Date Oct. 17, 2007) for U.S. Appl. No. 11/406,911, filed Apr. 19, 2006; Confirmation No. 7351.

Challstrom, C.W., NOAA Chairperson, Federal Geodetic Control Subcommittee; Input Formats and Specifications of the Geodetic Survey Data Base, Appendix P (The Description Processing Handbook); Mar. 2003; Appendix P updated Mar. 2007 U.S. Dept. of Commerce, NOAA, NGS, Silver Springs MD; http://www.ngs.noaa.gov/FGCS/BlueBook/Sections: 3.3.1, 6, 7; 54 pages; Dec. 29, 2010.

Abstract of JP2018947 (A)—Jan. 21, 2000; "Information Managing Device Underground Burying," 1 page.

Office Action (Mail Date Oct. 17, 2007) for U.S. Appl. No. 11/406,911, filed Apr. 19, 2006; Confirmation No. 7351.

Office Action (Mail Date Jan. 13, 2010) for U.S. Appl. No. 12/109,319; filed Apr. 24, 2008; Confirmation No. 7351.

Notice of Allowance (Mail Date Feb. 4, 2008) for U.S. Appl. No. 11/406,911, filed Apr. 19, 2006; Confirmation No. 7351.

Notice of Allowance (Mail Date May 11, 2010) for U.S. Appl. No. 12/109,319, filed Apr. 24, 2008; Confirmation No. 3211.

Pham, H.Q., et al., "Epoxy Resins", Kirk-Othmer Encyclopedia of Chemical Technology; vol. 10; pp. 347-471; Copyright John Wiley & Sons, Inc.; published Nov. 19, 2004.

Supplemental Notice of Allowability (Mail Date Apr. 9, 2008) for U.S. Appl. No. 11/406,911, filed Apr. 19, 2006; Confirmation No. 7351.

Amendment (Mail Date No. Apr. 12, 2011), for U.S. Appl. No. 12/306,272, Confirmation No. 2136.

Amendment (Mail Date Oct. 31, 2011), for U.S. Appl. No. 12/306,272, Confirmation No. 2136.

Amendment and Terminal Disclaimer (Mail Date Feb. 1, 2010), for U.S. Appl. No. 12/109,319, Confirmation No. 3211.

Non-Final Office Action (Mail Date Jan. 19, 2011), for U.S. Appl. No. 12/306,272, Confirmation No. 2136.
Non-Final Office Action (Mail Date Nov. 29, 2011), for U.S. Appl. No. 12/336,594, Confirmation No. 2197.
Non-Final Office Action (Mail Date Dec. 6, 2011), for U.S. Appl. No. 12/306,272, Confirmation No. 2136.
Non-Final Office Action (Mail date Aug. 9, 2011), for U.S. Appl. No. 12/306,272, Confirmation No. 2136.
Non-Final Office Action (Mail date Jan. 31, 2012), for U.S. Appl. No. 12/335,601, Confirmation No. 1388.
Notice of Allowance and Fees Due (Mail date Nov. 15, 2011), for U.S. Appl. No. 12/180,664, Confirmation No. 1523.
Notice of Allowance and Fee Due (Mail date May 13, 2011), for U.S. Appl. No. 12/306,272, Confirmation No. 2136.
Notice of Allowance and Fees Due (Mail date Jan. 27, 2012), for U.S. Appl. No. 12/180,664, Confirmation No. 1523.
Preliminary Amendment (Mail Date May 11, 2009), for U.S. Appl. No. 12/306,272, Confirmation No. 2136.
Preliminary Amendment (Mail Date Dec. 23, 2008), for U.S. Appl. No. 12/306,272, Confirmation No. 2136.
Request for Continued Examination (Mail Date Jul. 1, 2011), for U.S. Appl. No. 12/306,272, Confirmation No. 2136.

* cited by examiner

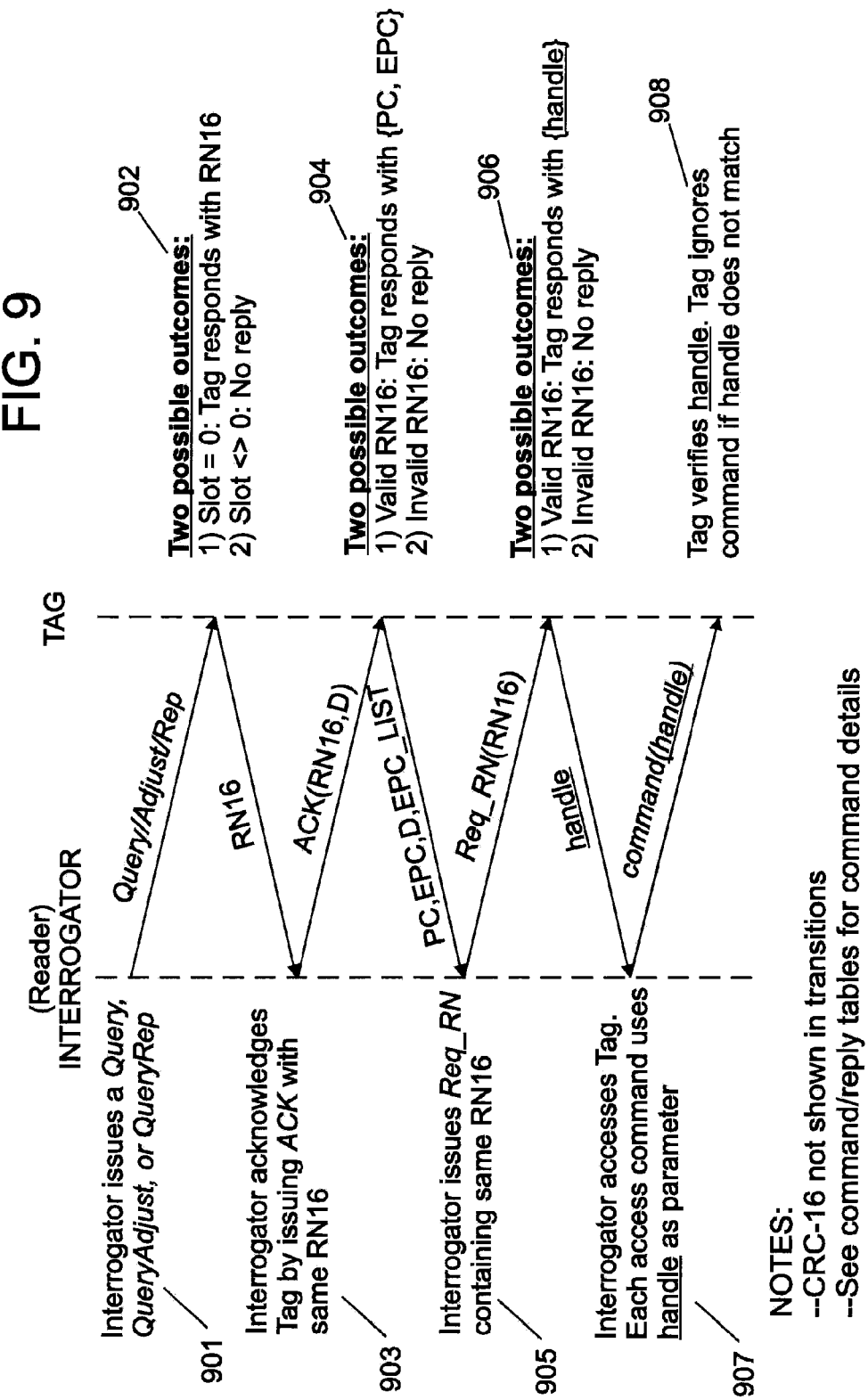

METHODS AND SYSTEMS FOR RFID TAG GEOGRAPHICAL LOCATION USING BEACON TAGS AND LISTENING TAGS

CROSS-REFERENCE TO RELATED APPLICATIONS

This application contains subject matter which is related to the subject matter of the following co-pending applications, each of which is assigned to the same assignee as this application, International Business Machines Corporation of Armonk, N.Y. Each of the below listed applications is hereby incorporated herein by reference in its entirety: METHOD AND SYSTEM FOR RFID TAG GEOGRAPHICAL LOCATION USING BEACON TAGS AND LISTENING TAGS, European reference number EP08305292, filed in the European Patent Office Jun. 20, 2008.

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND

1. Field of the Invention

Exemplary embodiments relate in general to RFID technology, and in particular to using RFID technology to locate devices. Still more particularly, the present invention relates to a method and system for cost-effectively locating devices using RFID technology.

2. Description of Background

The use of radio frequency (RF) identification (RFID) technology to be alerted of devices that are equipped with an RFID tag (i.e., an electronic tag that emits an RFID signal when triggered by an RF signal) is generally known in the art. In conventional systems, a number of RF transceivers are provided in a monitored environment. These transceivers generate and transmit RF signals in a particular sub-area defined by the strength of the RF signal and location of the RF transceiver relative to the area of projection.

Radio frequency identification is a technology similar in theory to bar code identification. An RFID system consists of an antenna and a transceiver, which read the radio frequency and transfer the information to a processing device, and a transponder, or tag, which is an integrated circuit containing the RF circuitry and information to be transmitted. RFID systems can be used just about anywhere, from clothing tags to missiles to pet tags to food: anywhere that a unique identification system is needed. One of the key differences between RFID and bar code technology is RFID eliminates the need for line-of-sight reading that bar coding depends on.

The problem, however, is that RFID tags located around an antenna answer but do not provide their localization. In some cases, it is interesting to know where the tag is located such that the attached item can be retrieved. So the problem is to get the 3D coordinates of a tag.

Localization with conventional solutions is based on multiple antennas receiving the response from the tag (whose location is being searched) such that the reader by geometric calculation determines the position of the tag. Unfortunately these solutions require the installation of multiple expensive antennas. Also, there is substantial cost in implementing conventional locating systems because the ability to implement the conventional systems on a large scale is limited by the large number of high-logic devices that are required.

A need exists to have a generally applicable solution to overcome these and other limitations found with conventional systems.

SUMMARY

A radio frequency identification method is provided for locating a listening tag using beacon tags in accordance with exemplary embodiments. A reader transmits a reader signal. The reader signal is received by beacon tags. The reader signal is received by a listening tag. The beacon tags each transmit a beacon signals, where each of the beacon signals includes a beacon identification and a beacon distance to the reader. The listening tag receives each of the beacon signals. In response to receiving the beacon signals, neighbor distances are calculated for each of the beacon tags based on when each of the beacon signals is received by the listening tag, when the listening tag itself receives the reader signal, and a constant processing time. The neighbor distances are the individual distances from the listening tag to each one of the beacon tags. A list is stored, where the list includes the beacon identification for each of the beacon tags, the beacon distance to the reader for each of the beacon tags, and the neighbor distances for each of the beacon tags. The listening tag transmits the list of the beacon tag identification, distance of said beacon tag from the listening tag and a listening tag identification to the reader. A geographical position of the listening tag is calculated based on the beacon distance for each of the beacon tags, the beacon coordinates for each of the beacon tags, and a listening tag distance which is a distance from the reader to the listening tag.

System and computer program products corresponding to the above-summarized methods are also described and claimed herein.

Additional features and advantages are realized through the techniques of the present invention. Other embodiments and features of the invention are described in detail herein and are considered a part of the claimed invention. For a better understanding of the invention with advantages and features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

FIG. 9 illustrates a modification of the information carried by a protocol in terms of message exchange in accordance with exemplary embodiments.

Figure 1:
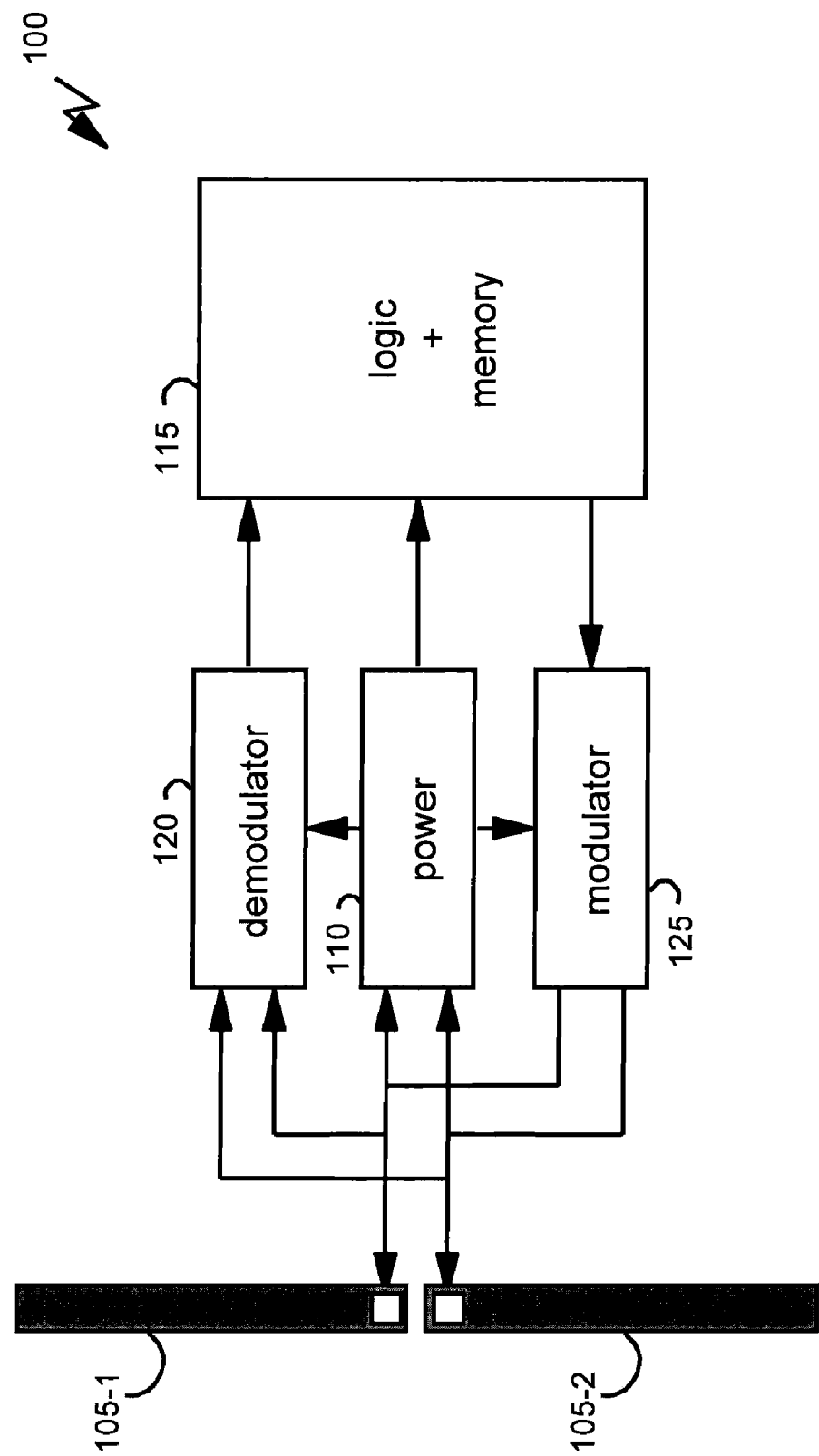
FIG. 1 depicts an example of the architecture of a passive HF or Ultra High Frequency (UHF) RFID tag.

The detailed description explains exemplary embodiments of the invention, together with advantages and features, by way of example with reference to the drawings.

DETAILED DESCRIPTION OF EXEMPLARY EMBODIMENTS

The present disclosure herein incorporates EP 07119759.4, which discusses tags that are able to listen to responses from other tags.

Exemplary embodiments provide a new tag which indicates its "beacon" nature and which may be placed at specific positions in the volume. When a "mobile tag" needs to be retrieved, a reader interrogates each beacon tag, and the beacon tag emits its identification (ID) and its "beacon" nature. So as the mobile tag is being searched for, the mobile tag listens for responses from beacon tags, the mobile tag calculates the distance between itself (mobile tag) and the beacon tag, and the mobile tag stores this distance. After the last beacon tag has responded, the reader reads the searched "mobile tag" in which the mobile tag answers with its own ID and the distance between itself (mobile) and each beacon tag (or the mobile tag can answer with its geographical position) in accordance with exemplary embodiments.

The core of any RFID system is the 'Tag' or 'Transponder', which can be attached to or embedded within objects, wherein data can be stored. An RFID reader, generically referred to as reader in the following description, sends out a radio frequency signal to the RFID tag that broadcasts back its stored data to the reader. The system works basically as two separate antennas, one on the RFID tag and the other on the reader. The read data can either be transmitted directly to another system like a host computer through standard interfaces, or it can be stored in a portable reader and later uploaded to the computer for data processing. An RFID tag system works effectively in environments with excessive dirt, dust, moisture, and/or poor visibility. It generally overcomes the limitations of other automatic identification approaches.

Several kinds of RFID, such as piezoelectric RFID and electronic RFID, are currently available. For example, passive RFID tags do not require a battery for transmission since generally, they are powered by the reader using an induction mechanism (an electromagnetic field is emitted by the reader antenna and received by an antenna localized on the RFID tag). This power is used by the RFID tag to transmit a signal back to the reader, carrying the data stored in the RFID tag. Active RFID tags comprise a battery to transmit a signal to a reader. A signal is emitted at a predefined interval or transmitted only when addressed by a reader.

When a passive high frequency (HF) RFID tag is to be read, the reader sends out a power pulse e.g., a 134.2 kHz power pulse, to the RFID antenna. The magnetic field generated is 'collected' by the antenna in the RFID tag that is tuned to the same frequency. This received energy is rectified and stored on a small capacitor within the RFID tag. When the power pulse has finished, the RFID tag immediately transmits back its data, using the energy stored within its capacitor as its power source. Generally, 128 bits, including error detection information, are transmitted over a period of 20 ms. This data is picked up by the receiving antenna and decoded by the reader. Once all the data has been transmitted, the storage capacitor is discharged, resetting the RFID tag to make it ready for the next read cycle. The period between transmission pulses is known as the 'sync time' and lasts between 20 ms and 50 ms depending on the system setup. The transmission technique used between the RFID tag and the reader is Frequency Shift Keying (FSK) with transmissions generally comprised between 124.2 kHz and 134.2 kHz. This approach has comparatively good resistance to noise while also being very cost effective to implement. Many applications require that the RFID tag attached to objects be read while traveling at specific speeds by a readout antenna.

RFID tags can be read-only, write-once, or read-write. A read-only RFID tag comprises a read-only memory that is loaded during manufacturing process. Its content cannot be modified. The write-once RFID tags differ from the read-only RFID tags in that they can be programmed by the end-user, with the required data, e.g., part number or serial number. The read-write RFID tags allow for full read-write capability, allowing a user to update information stored in a tag as often as possible in the limit of the memory technology. Generally, the number of write cycles is limited to about 500,000 while the number of read cycles is not limited. A detailed technical analysis of RFID tag technology is disclosed, e.g., in RFID (McGraw-Hill Networking Professional) by Steven Shepard, edition Hardcover.

Now turning to the FIG. 1, FIG. 1 depicts an example of the architecture of a passive HF or Ultra High Frequency (UHF) RFID tag 100. As shown, the dipole antenna comprises two parts 105-1 and 105-2 is connected to a power generating circuit 110 that provides current from the received signal to the logic and memory circuit 115, to the demodulator 120, and to the modulator 125. The input of demodulator 120 is connected to the antenna (105-1 and 105-2) for receiving the signal and for transmitting the received signal to the logic and memory circuit 115, after having demodulated the received signal. The input of modulator 125 is connected to the logic and memory circuit 115 for receiving the signal to be transmitted. The output of modulator 125 is connected to the antenna (105-1 and 105-2) for transmitting the signal after it has been modulated in modulator 125.

The architecture of a semi-passive RFID tag is similar to the one represented in FIG. 1, the main difference being the presence of a power supply that allows it to function with much lower signal power levels, resulting in greater reading distances. Semi-passive tags do not have an integrated transmitter contrary to active tags that comprise a battery and an active transmitter allowing them to generate high frequency energy and to apply it to the antenna.

As disclosed in "A basic introduction to RFID technology and its use in the supply chain", White Paper, Laran RFID, when the propagating wave from the reader collides with the tag antenna in the form of a dipole, part of the energy is absorbed to power the tag and a small part is reflected back to the reader in a technique known as back-scatter. Theory dictates that for the optimal energy transfer, the length of the dipole must be equal to half the wavelength, or ½. Generally, the dipole is made up of two ¼ lengths. Communication from tag to reader is achieved by altering the antenna input impedance in time with the data stream to be transmitted. This results in the power reflected back to the reader being changed in time with the data, i.e., it is modulated.

Figure 2A:
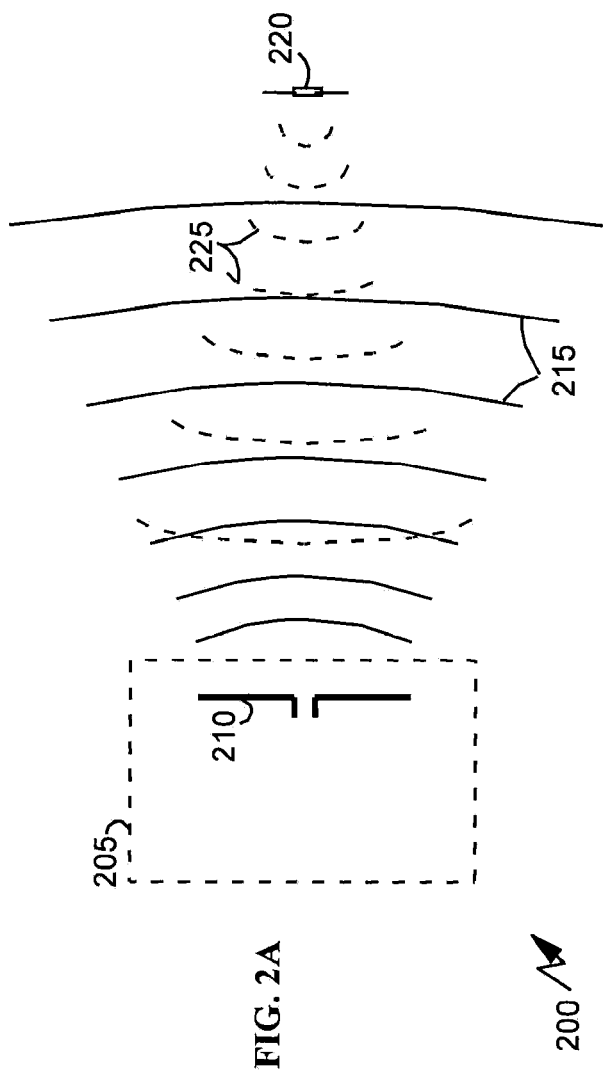
FIGS. 2A and 2B show an RFID system.
Figure 2B:
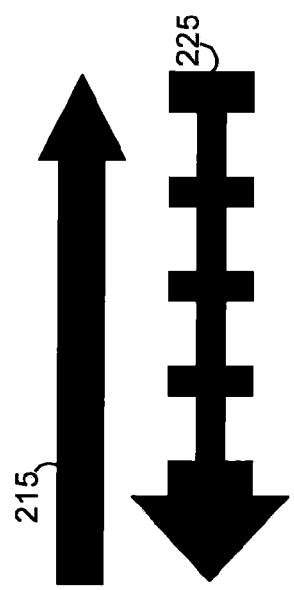

FIGS. 2A and 2B show an RFID system 200. As depicted in FIG. 2A, the RFID system 200 comprises a reader 205 having an antenna 210. The antenna 210 emits a signal 215 that is received by an RFID tag 220. The signal 215 is reflected in the RFID tag 220 and re-emitted as illustrated with dotted lines referred to as a reflected signal 225.

FIG. 2B illustrates the signal 215 emitted by the antenna 210 of the reader 205 and the reflected signal 225 by the RFID tag 220. As shown in FIG. 2B, the reflected signal 225 is modulated as compared to the signal 215.

Figure 3:
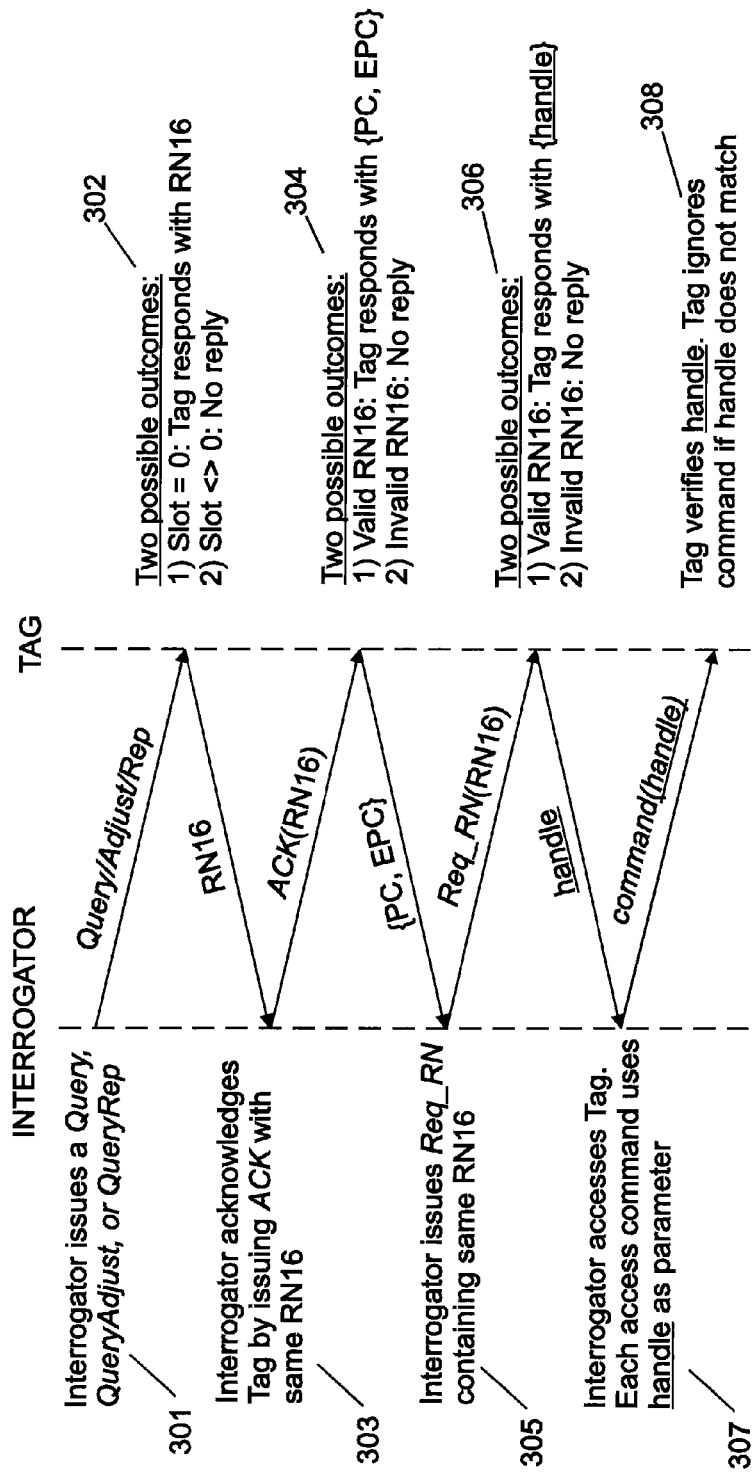
FIG. 3 illustrates a standard protocol between a reader and tags.

FIG. 3 illustrates a protocol between a reader and tags. Reference can be made to EPC™ Radio-Frequency Identity Protocols Class-1 Generation-2 UHF RFID Protocol for Communications at 860 MHz-960 MHz Version 1.0.9.

Readers manage tag populations using three basic operations. Each of these operations comprises one or more commands. The operations are defined as follows:

a) Select: The process by which a reader selects a tag population for inventory and access. Readers may use one or more select commands to select a particular tag population prior to inventory.

b) Inventory: The process by which a reader identifies tags. A reader begins an inventory round by transmitting a Query command. One or more tags may reply. The reader detects a single tag reply and requests the EPC from the tag. Note that FIG. 3 is an example of a reader inventorying and accessing a single tag.

c) Access: The process by which a reader transacts with (reads from or writes to) individual tags. An individual tag must be uniquely identified prior to access. Access comprises multiple commands.

Now providing further details regarding inventorying tag populations in FIG. 3, the inventory command set includes: Query, QueryAdjust, QueryRep, ACK, and NAK. Query initiates an inventory round and decides which tags participate in the round (where "inventory round" is defined as the period between successive Query commands) at 301.

Query contains a slot-count parameter Q. Upon receiving a Query, participating tags shall pick a random value in the range $(0, 2Q-1)$, inclusive, and shall load this value into their slot counter. Tags that pick a zero shall transition to the reply state and reply immediately. Tags that pick a nonzero value shall transition to the arbitrate state and await a QueryAdjust or a QueryRep command. Assuming that a single tag replies, the query-response algorithm proceeds as follows.

The tag backscatters an RN16 as it enters reply at 302. The reader acknowledges the tag with an ACK containing this same RN16 at 303. The acknowledged tag transitions to the acknowledged state, backscattering its EPC and PC at 304.

The reader issues a QueryAdjust or QueryRep, causing the identified tag to invert its inventoried flag and transition to ready, and potentially causing another tag to initiate a query response dialog with the Reader, as in step 301 above.

If the tag fails to receive the ACK in step 303 within a predefined time (e.g., T2), or receives the ACK with an erroneous RN16, it shall return to arbitrate state.

If multiple tags reply in step 302 but the reader, by detecting and resolving collisions at the waveform level, can resolve an RN16 from one of the tags, the reader can ACK the resolved tag. Unresolved tags receive erroneous RN16s and return to arbitrate without backscattering their EPC.

If the reader sends a valid ACK (i.e., an ACK containing the correct RN16) to the tag in the acknowledged state at 305, the tag shall re-backscatter its EPC at 306. The tag may also send its handle. At 307, the reader receives the handle and uses the handle in each access command. At 308, the tag verifies the handle.

At any point the reader may issue a NAK, in response to which all tags in the inventory round shall return to arbitrate without changing their inventoried flag.

After issuing a Query to initiate an inventory round, the reader typically issues one or more QueryAdjust or QueryRep commands. QueryAdjust repeats a previous Query and may increment or decrement Q, but does not introduce new tags into the round. QueryRep repeats a previous Query without changing any parameters and without introducing new tags into the round. An inventory round can contain multiple QueryAdjust or QueryRep commands. At some point the reader will issue a new Query, thereby starting a new inventory round.

Tags in the arbitrate or reply states that receive a QueryAdjust first adjust Q (increment, decrement, or leave unchanged), then pick a random value in the range $(0, 2Q-1)$, inclusive, and load this value into their slot counter.

Tags that pick zero shall transition to the reply state and reply immediately. Tags that pick a nonzero value shall transition to the arbitrate state and await a QueryAdjust or a QueryRep command.

Tags in the arbitrate state decrement their slot counter every time they receive a QueryRep, transitioning to the reply state and backscattering an RN16 when their slot counter reaches 0000h. Tags whose slot counter reached 0000h, who replied, and who were not acknowledged (including tags that responded to the original Query and were not acknowledged) shall return to arbitrate with a slot value of 0000h and shall decrement this slot value from 0000h to 7FFFh at the next QueryRep, thereby effectively preventing subsequent replies until the tag loads a new random value into its slot counter. Tags shall reply at least once in $2Q-1$ QueryRep commands.

Although tag inventory is based on a random protocol, the Q-parameter affords network control by allowing a reader to regulate the probability of tag responses. Q is an integer in the range $(0, 15)$; thus, the associated tag-response probabilities range from $2^0=1$ to $2^{-15}=0.000031$.

In accordance with exemplary embodiments, a solution is provided to address problems discussed herein. A principle of exemplary embodiments is based on each mobile tag being able to receive answers transmitted by the neighbors beacon tags and to return, when polled, the list of detected neighbor tags to the reader. By compiling this list of neighbor tags, the reader is able to determine the geographical position of the mobile tag in exemplary embodiments.

In accomplishing the above, the reader and the tags are modified in accordance with exemplary embodiments. The reader may be modified (1) to compute the distance between the reader and the polled tag, (2) to resend and set the distance between the reader and the polled tag to the polled tag (when the reader has computed the distance between itself and the polled tag, the reader can send this distance to the polled tag in case this information is of any value to the polled tag), and (3) to memorize geographical positions of beacon tags.

In exemplary embodiments, the mobile tag may be modified to memorize the distance between the reader and itself (the mobile tag). All (mobile and beacon) tags measure the time separating a polling request (from the reader) and the response from the other polled tag(s), in order to determine the distance between the other polled tag(s) and itself. The mobile tag saves the neighbor's EPC Tags in local memory as well as the distance from the mobile tag to the neighbor (beacon) tag. The mobile tag can resend in a response its own ID (EPC), the distance between the reader and itself, and the list of neighbor tags with the distances separating the neighbor tags to itself. The mobile tags have a constant processing time. This processing time is the time spent between reception of the first bit of polling (request) and the transmission of the first bit of the response.

In accordance with exemplary embodiments, beacon tags are modified to memorize the distance between the reader and itself (beacon tag) and to resend in a response its own ID (EPC), and the distance between the reader and itself (beacon tag).

Figure 4:
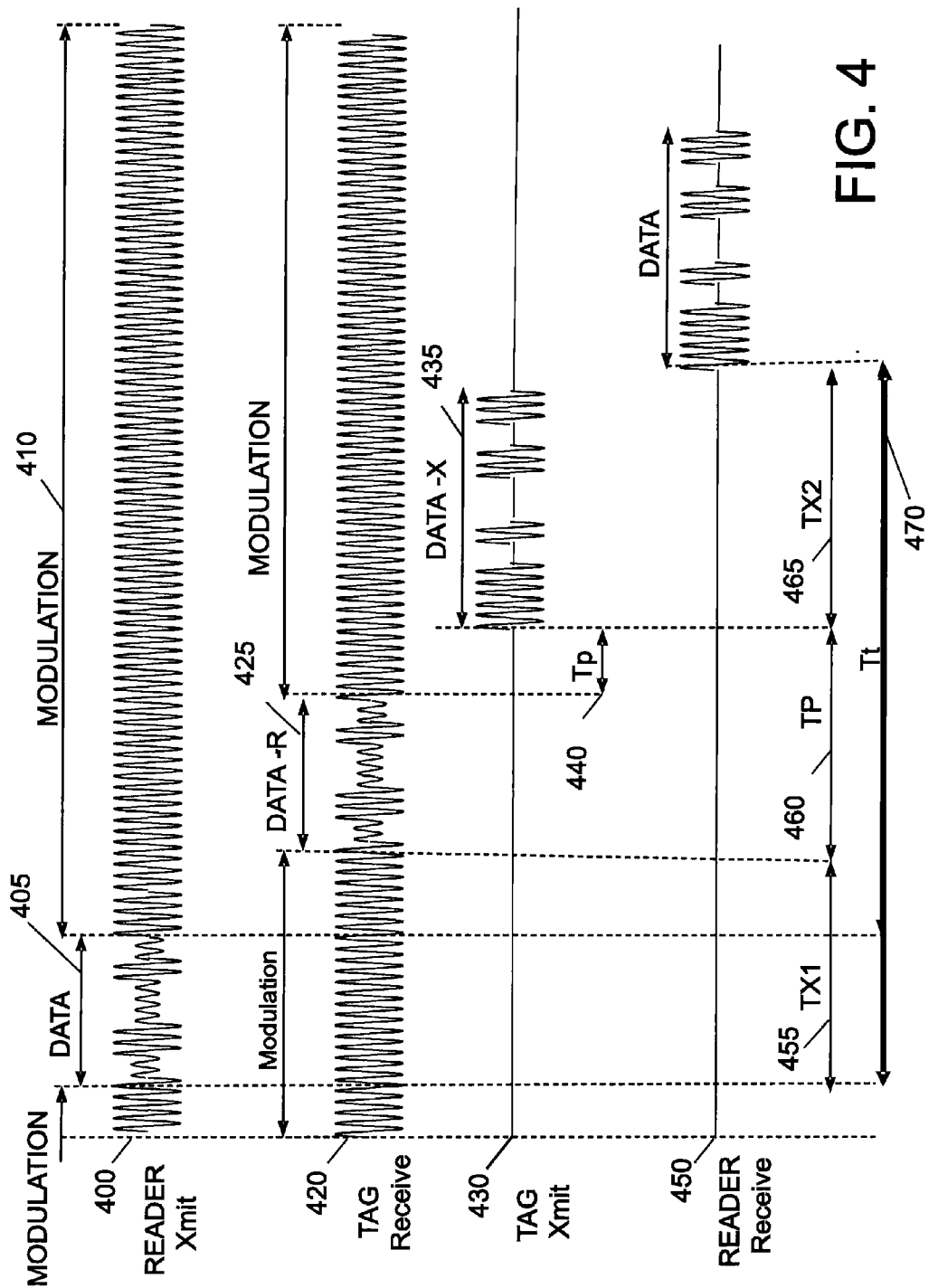
FIG. 4 describes how a reader can compute and return the distance between the reader and a polled tag in accordance with exemplary embodiments.

FIG. 4 describes how a reader can compute and return the distance between the reader and a polled tag in accordance with exemplary embodiments. Also, exemplary embodiments illustrate how a tag can detect the response issued by neighbor tags answering to the reader and describe the new parameters exchanged between the reader and the tags. Once the reader gets the new information introduced by exemplary embodiments, an algorithm is executed by the reader (or a tag) to geolocalize a given tag.

Referring back to FIG. 4, the following illustrates data resulting from a simulation demonstrating the value and features of exemplary embodiments.

Step 1. The reader at 400 sends a modulation signal 410 to transmit energy to the passive tags. After a predefined time, the reader at 400 starts polling by sending a data command 405. The reader at 400 starts a counter Ct on the first bit of polling data 105 sent by the reader.

Step 2. The polled tag at 420 receives the modulation followed by the polling data 425 received from the reader. The time between the first bit of polling data sent by the reader 400 and received by the polled tag represents the transmission time TX1 (455), which is equivalent to the distance:

$$D=C*TX, \text{ where } C \text{ is the Light speed } 300*10^6 \text{ m/s}$$
$$\text{and } TX \text{ is the transmission time.}$$

Step 3. The received polling data are processed during a time Tp (440) and the response (Data-X) 435 is transmitted by the tag at 430 to the reader.

Step 4. The reader at 450 stops the counter Ct started at step 1, when the first bit of the response data is received. The value of this counter represents the total time Tt (470) taken to transmit the polling data from the reader to tag TX1 (455), to receive and process the polling data TP (460) and to transmit the response from the tag to the reader TX2 (465). All of which can be expressed as:

$$Tt=TX1+TP+TX2.$$

Since the time needed to receive data is a function of the data length and since the process time is also variable, exemplary embodiments of the invention add a constraint in the tag to turn TP into a constant. The transmission of the response is triggered by the expiration of a timer set at the first polling data bit reception of data-R 425.

Since TX1=TX2, we have:

$$TX = \frac{Tt-TP}{2}.$$

Figure 5:
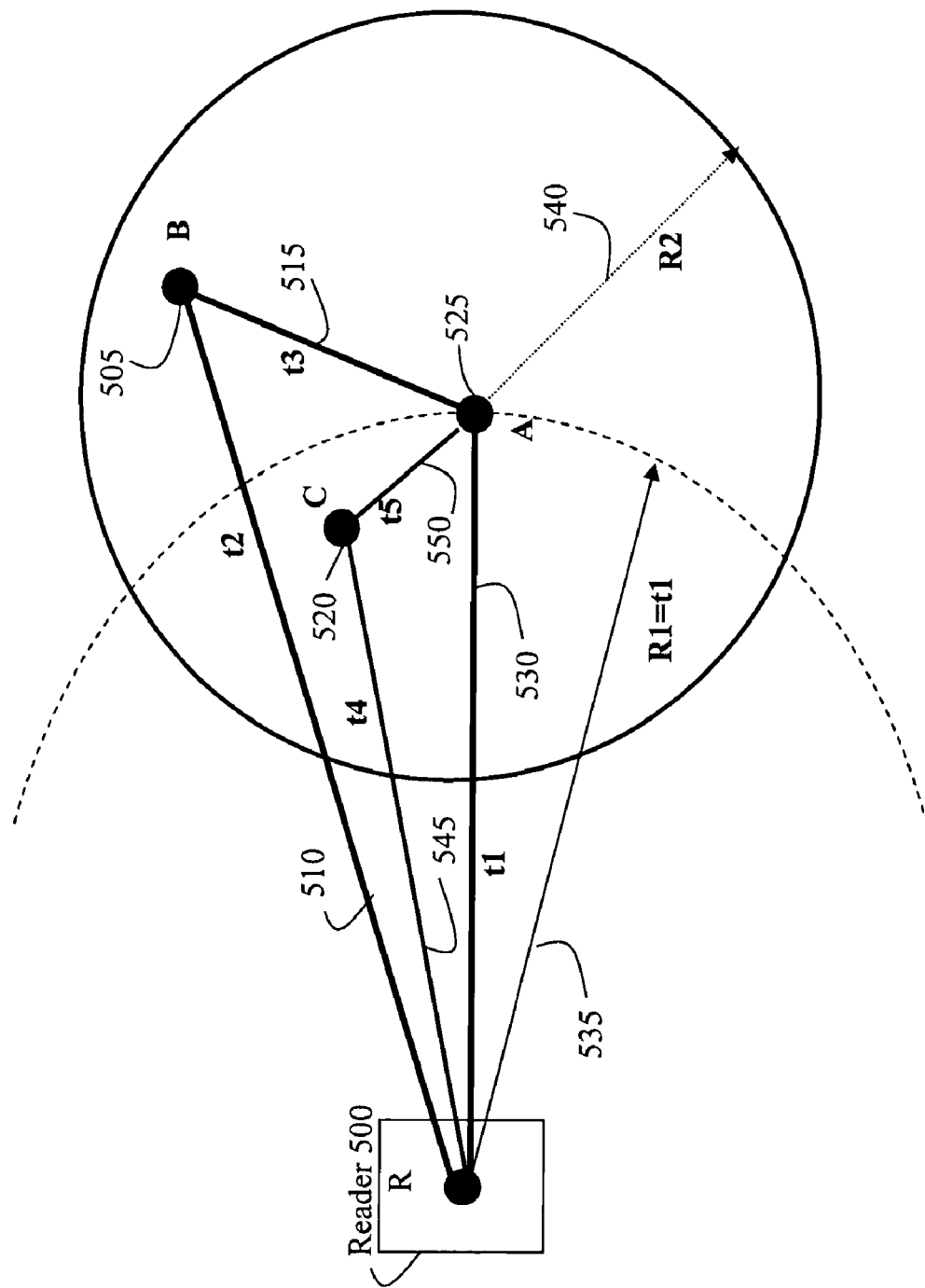
FIG. 5 and FIG. 6 illustrate how a non-polled tag may calculate the distance between a polled tag and itself (non-polled tag) in accordance with exemplary embodiments.
Figure 6:
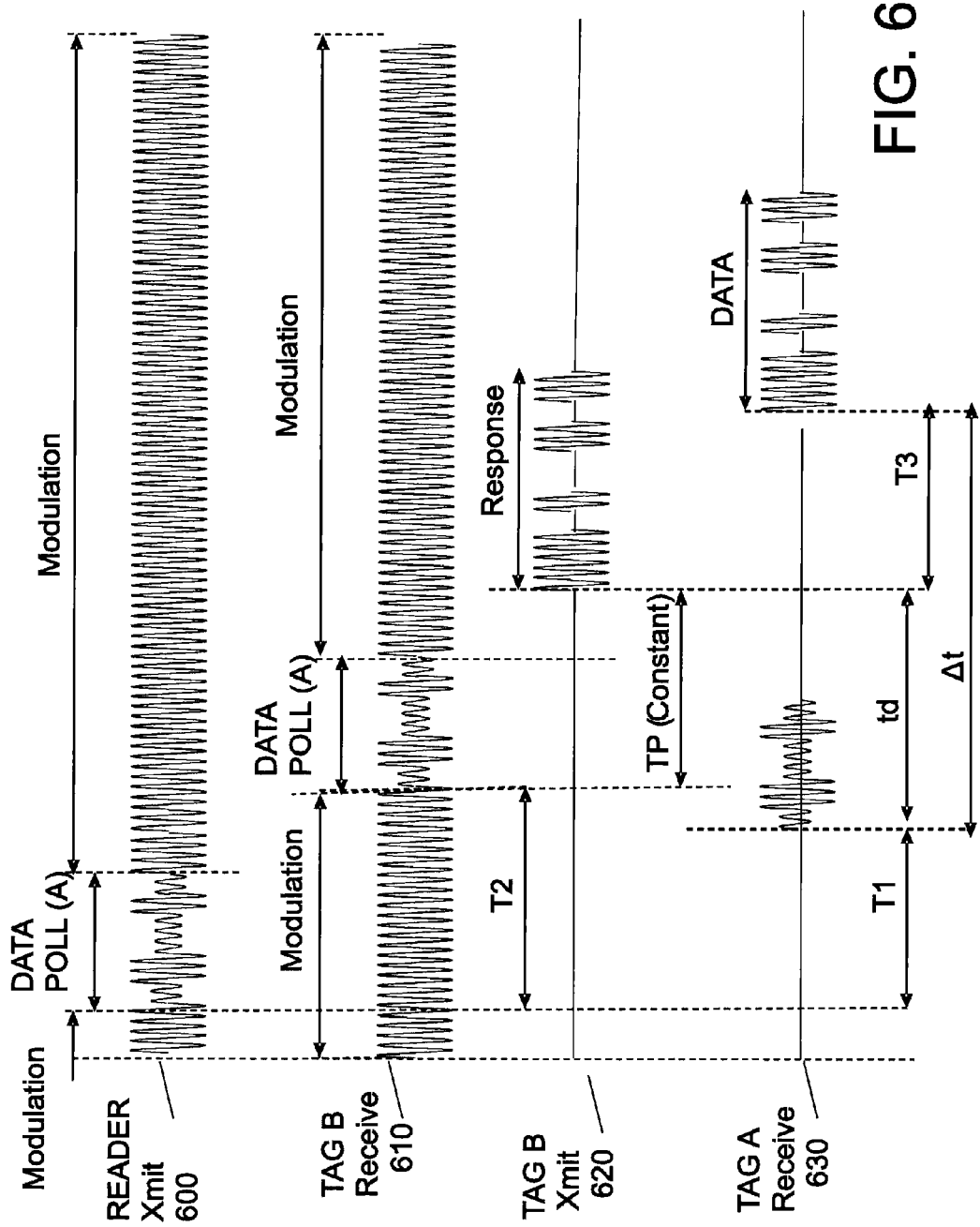

FIG. 5 and FIG. 6 illustrate how a non-polled tag may calculate the distance between a polled tag and itself (non-polled tag) in accordance with exemplary embodiments. FIG. 6 illustrates signals being transmitted by the reader (polling) and tag B (response), as well as the signals received by tag A and tag B in accordance with exemplary embodiments. References will be made to FIGS. 5 and 6 below.

In FIG. 5, a reader 500 polls a tag B 505. It is assumed that the tag A 525 has already been polled and consequently tag A 525 knows the distance T1 530 between tag A 525 and the reader 500. As soon as the tag B 505 receives the polling message, the distance T2 between tag B 505 and the reader 500 is known by the tag B 505. After processing of the polling, tag B 505 sends a response containing either the tag ID and its distance T2 from the reader 500. This response (from tag B 505) to the reader 500 is also received by several other tags (such as tag A) neighboring tag B.

Tag A 525 computes the delay Δt between the reception of the polling of tag B 505 and the response from the tag B 505. One skilled in the art understands that that the tag A has the computing means allowing it to evaluate the time duration between two events.

The polling command sent by the reader 500 arrives in tag A 525 at time T1, while it arrives in tag B 505 at time T2. As tag B 505 is farther than tag A 525 from the reader 500, commands arrive in tag B T2−T1 later than in tag A 525. The response from tag B 505 arrives in tag A 525 (time reference is the command sent by the reader) at time T2+TP+T3.

In accordance with exemplary embodiments, T2 is proportional to the distance between the reader and Tag B. TP is the processing time, which is a constant in exemplary embodiments of the invention. T3 is proportional to the distance between tag B and tag A.

Then, the tag A 525 can calculate the distance T3 which separates tag A from tag B.

For example, $\Delta t=(T2+T3+TP)-T1$.

Then, $\Delta t=(T2-T1)+T3+TP$.

Accordingly, $T3=\Delta t-(T2-T1)-TP$.

In the case of polling tag C 520 which is nearer to the reader 500 than tag A 525, the polling command arrives T1−T4 earlier in tag C 220 than tag A 525. In the same manner, tag A 225 may calculate the distance between itself (tag A) and tag C 520.

For example, $\Delta t=(T4+T5+TP)-T1$.

Then $\Delta t=(T4-T1)+T5+TP$.

Also, $T5=\Delta t-(T4-T1)-TP$.

When the reader 500 polls any tag, the reader 500 transmits the maximum distance R2 540 at which a tag may be considered as a neighbor tag. In FIG. 5, the circle (which is in fact a sphere) with radius R2 and centered at tag A represents the area (volume) where tags are neighbors of tag A.

In correlation with FIG. 5, FIG. 6 illustrates how the reader at 600 transmits signals and how the tag B transmits signal at 620. Also, FIG. 6 illustrates how tag B receives signals at 610 and how tag A receives signals at 630.

Figure 7:
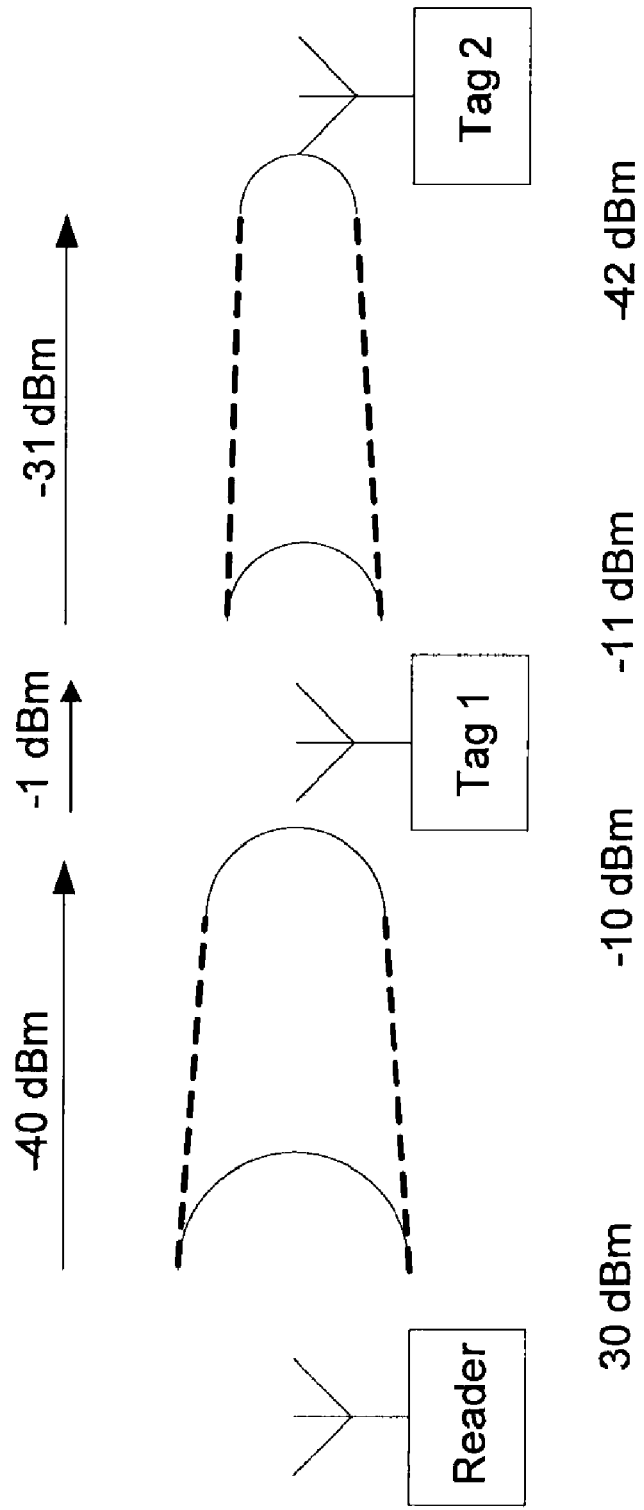
FIG. 7 illustrates an example of a tag that is able to read answers from another tag in accordance with exemplary embodiments.

FIG. 7 illustrates an example of a tag that is able to read answers from another tag in accordance with exemplary embodiments.

A passive UHF tag requires a minimum power of around −10 dBm (100 μW) to be activated. This power is needed to power the tag's electronic circuits but is quite above the receiver sensitivity of the tag. In the case of a semi-active tag, the electronic circuits are powered with a battery and the only power limitation comes from the tag receiver. A common sensitivity for a receiver of a semi-active tag is about −42 dBm (63 nW).

To communicate with the reader, the tag uses tag backscatter of the reader carrier wave. The tag chip is able to vary its antenna load impedance so that the incident wave (from the reader) could be either fully absorbed or fully reflected, which in effect modulates the backscattered signal. This signal is then decoded by the RFID reader to interpret the tag response.

Considering a tag antenna gain (2 dBi) and the short length of the pass to tag chip (less than 1 cm), the backscattering yield is very good. The theoretical reflection factor K is in the following formula:

P re-radiated=K Pa G, where Pa is the power collected by the antenna and G is the gain of the antenna, and where K=1 for Z chip=Z antenna, and K=0 for Z chip→infinite.

Measurements in an anechoic chamber commonly give a tag return loss of 32 dB for a measuring distance of 50 cm (cf K. V. Seshagiri Rao IEEE white paper 12/2005). Considering a signal attenuation on 1 meter, the loss in the air is:

$$Loss=10 \ Log \ [(4*\pi*D)/\lambda]^2=31,15 \ dB \ at \ 860 \ MHz.$$

We see that the loss of the backscattering without modulation is less than 1 dB.

Consider two tags with their gains of 2 and working at 860 MHz located at the maximum distance from the reader where they receive the minimum carrier power of −10 dBm to be activated. Also, consider a RFID reader with 1 w (30 dBm) of emitted power. The theoretical range of such a system is given by the point where the carrier wave attenuation is:

$$C_{att}=30 \ dBm-(-10 \ dBm)=40 \ dBm.$$

This attenuation of −40 dBm corresponds to a 3 meter range. Note that this is a worst case (scenario) to demonstrate the validity of the communication between tags but the current technology could give a two fold or three fold better range. We could note also that in the same conditions a semi-passive tag would give a range of 110 m.

The communication range between two tags, within the limits of communication range with the reader, is given by the maximum attenuation of the backscattered signal to achieve the minimum of −42 dBm representing tag receiver sensitivity. RCV sensitivity−Incident level−Backscattered yield=Permitted attenuation. Accordingly, −42 dBm−(−10 dBm)−(−1 dBm)=−31 dBm which represents 1 meter. The two tags will be able to communicate up to 1 meter of distance.

If we consider a tag located at 1.5 meters from the reader, the signal that the tag receives will be attenuated by 34.6 dB so the tag will need an additional −4.6 dBm to activate the tag. RCV sensitivity−Incident level−Backscattered yield=Permitted attenuation. Accordingly, −42 dBm−(−4.6) dBm−(−1 dBm)=−36.4 dBm which represents 2 meters. The two tags will be able to communicate up to 2 meters of distance.

If we consider a tag located at 1 meter from the reader, the signal the tag receives will be attenuated by 31 dB so the tag will need an additional −1 dBm to activate the tag. RCV sensitivity−Incident level−Backscattered yield=Permitted attenuation. Accordingly, −42 dBm−(−1 dBm)−(−1 dBm)=−40 dBm which represents 3 meters. The two tags will be able to communicate up to 3 meters of distance.

FIG. 9 illustrates a modification of the information carried by a protocol in terms of message exchange in accordance with exemplary embodiments. As seen in FIG. 9, the message exchange has not been altered, but new parameters have been added to existing messages in accordance with exemplary embodiments. Although FIG. 9 illustrates steps by which an interrogator (reader) inventories and accesses a single tag, it is understood that the protocols in FIG. 9 are not limited to a single tag.

Query initiates an inventory round and decides which tags participate in the round (where "inventory round" is defined as the period between successive Query commands) at 901.

The tag backscatters an RN16 as it enters reply at 902. Normally, the reader acknowledges the tag with an ACK containing this same RN16. However, in accordance with exemplary embodiments, at 903, the ACK now has two parameters: RN16 and D. RN16 is a tag computed random number that uniquely identifies the tag. D is the distance between the polled tag and the reader. This value is computed by the reader between messages "Query/Adjust/rep" and "RN16".

Normally, the acknowledged tag transitions to the acknowledged state, backscattering its EPC and PC. However, in accordance with exemplary embodiments, the tag response at 904 now has four parameters: PC, EPC, D distance between the polled (answering) tag and the reader, and EPC_LIST list of neighbor beacon tags detected by polled tag.

If the reader sends a valid ACK (i.e., an ACK containing the correct RN16) to the tag in the acknowledged state at 905, the tag shall re-backscatter its EPC at 906. The tag may also send its handle at 906. At 907, the reader receives the handle and uses the handle in each access command. At 908, the tag verifies the handle.

Figure 10A:
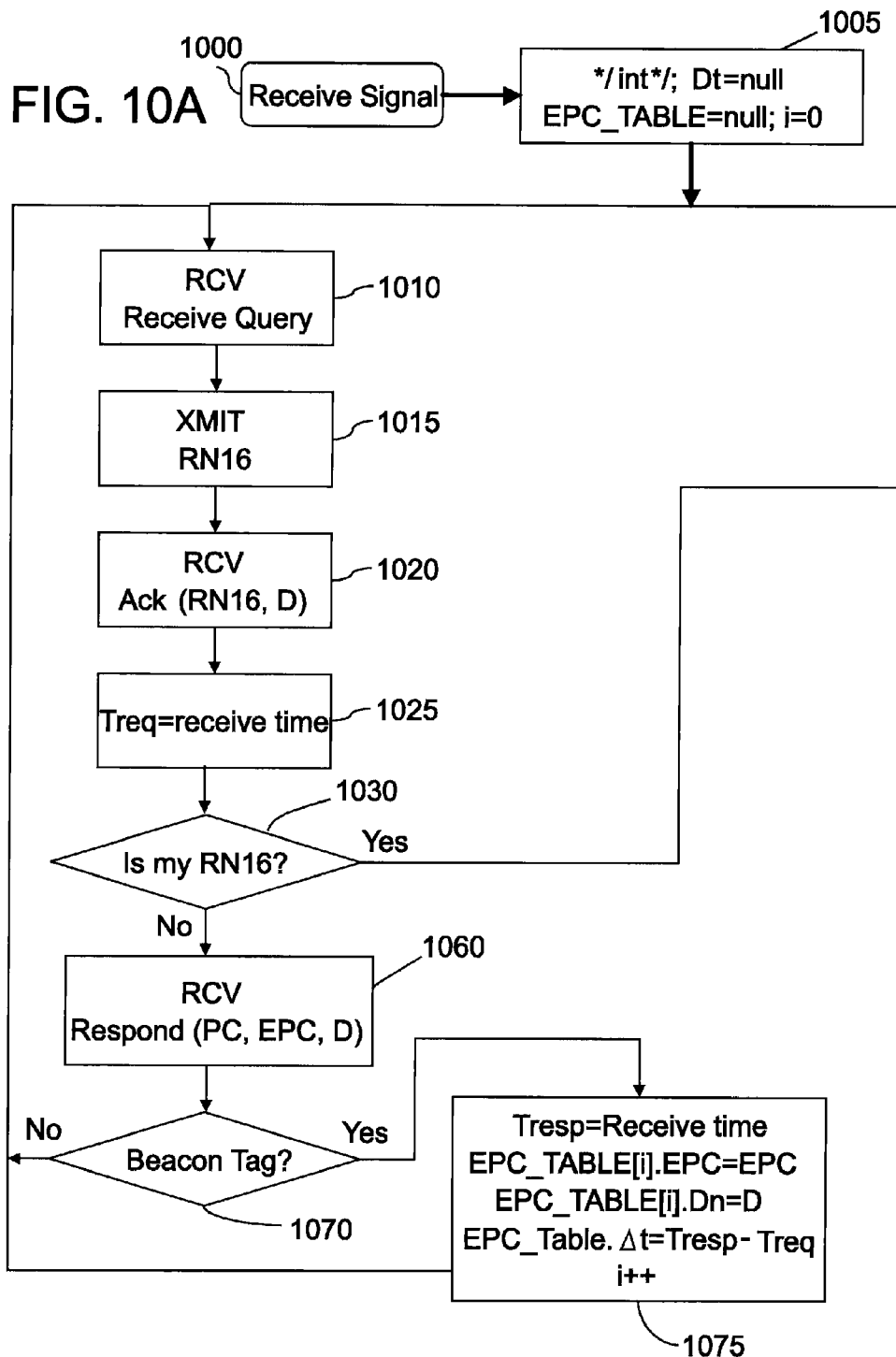
FIGS. 10A and 10B are a flow chart illustrating a behavior of tags in accordance with exemplary embodiments.
Figure 10B:
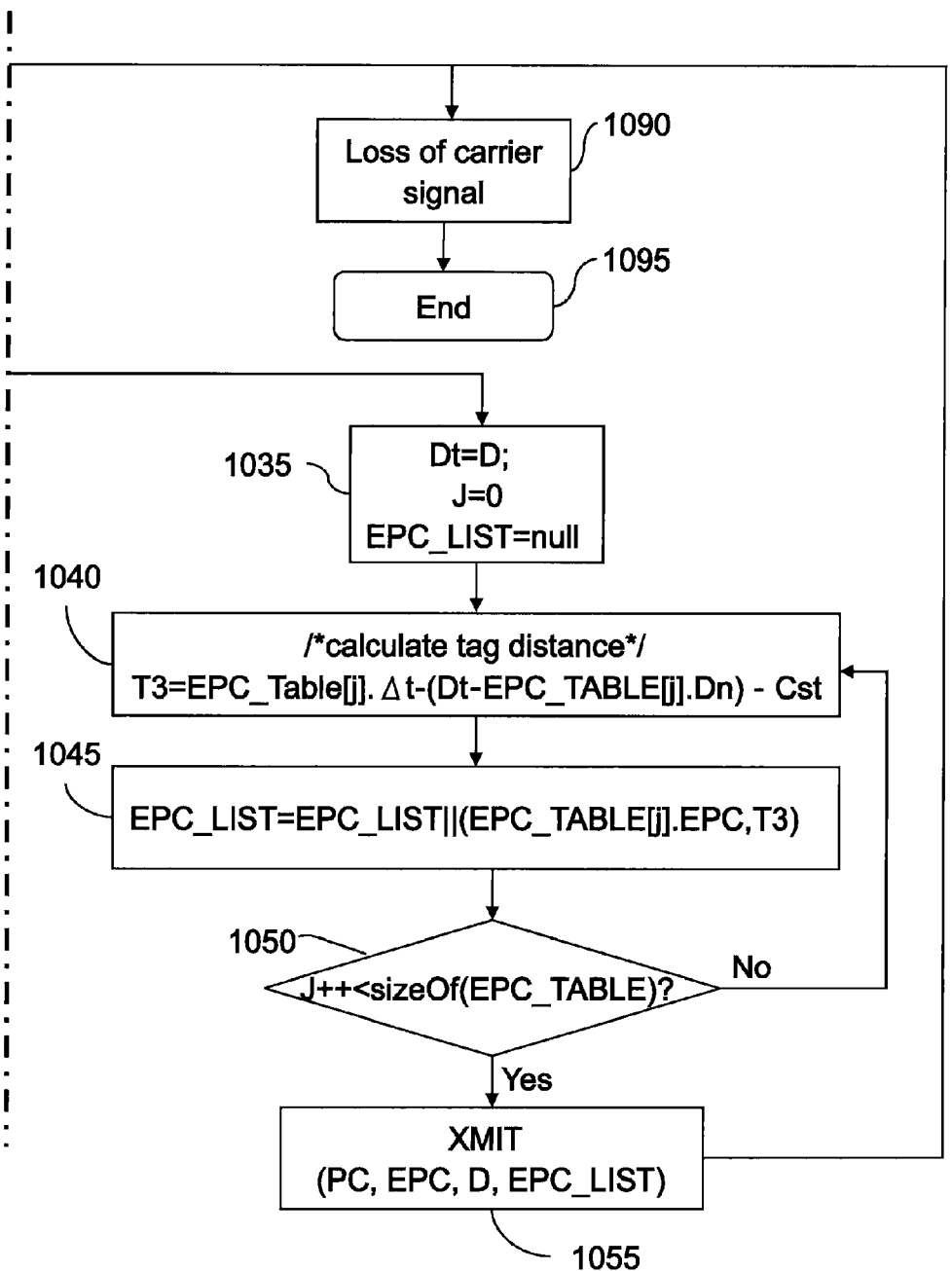

FIGS. 10A and 10B are a flow chart illustrating a behavior of tags in accordance with exemplary embodiments.

At step 1000, the tag is powered by receiving the signal carrier from the reader. At step 1005, the tag starts processing with initialization of the following variables. Dt is a variable that further indicates the distance between itself (tag) and the reader. Dt is initially set to 0. Table EPC_TABLE is a variable that records all beacon tag identifiers, the distance between the beacon tag and the reader, and the time difference between the request from the reader and the response from the beacon tag. The EPC_TABLE is initialized to NULL. "I" is a variable that counts the number of entries in EPC_TABLE, and I is set to 0.

Also, D is the distance between the responding tag and the reader. Dt is the distance, e.g., between tag A and the reader, which is equivalent to T1 (see FIG. 5). Dn is the distance, e.g., between tag B neighbor and the reader, which is equivalent to T2 (see FIG. 5). Cst is the processing time.

At step 1010, a Query sent by the reader is received by the tag (for future use), and the tag responds with its RN16 at step 1015.

At step 1020, an Ack is received for a particular RN16. The tag saves the receive time in the variable Treq at step 1025, and a checking is performed by the reader to determine if the RN16 corresponds to RN16 previously sent by this tag at step 1030. If determination is YES, process continues at step 1035. If NO, Ack received carries an RN16 belonging to another tag and the process continues at step 1060.

At step 1060, RN16 corresponds to another tag, so the reader waits to receive the answer from the tag owner of the acknowledged RN16. At step 1060, the response contains tag EPC (identification), PC, and the new parameter D which indicates the distance between the responding tag and the reader.

A check is performed at step 1070 on the EPC to determine if the response is coming from a beacon tag or not. If (NO) the response is not coming from a beacon tag, control is given to wait for the next event, such as a new query at step 1010 or lost of signal carrier at step 1090.

If (YES) the response is coming from a beacon tag, the variable Tresp is set with the received time of the response at step 1075. Also, at step 1075, tag identification EPC is saved in the current free entry of the EPC_TABLE, the distance separating the responding tag from reader is saved, and the time difference between the response reception "Tresp" and the Ack reception "Treq" is also saved in the table entry of the EPC_TABLE. Further, the free table entry number "I" is incremented at step 1075. Then control is given to wait for the next event (e.g., a new query at step 1010 or loss of signal carrier at step 1090). It is understood that the step 1075 may be more complex, if the reader receives a response from a tag for which an entry already exists in the EPC_TABLE. In this case, before creating a new entry in the table, a table lookup is necessary to verify whether the tag ID already exists (not represented in the flow chart).

At step 1035, (RN16 corresponds to the active tag) variable Dt is initialized with the received distance D computed by the reader. Dt is the distance between the tag and the reader. The index "i" in EPC_TABLE is set to 0 to point to the first table entry and EPC_LIST is set to null. "I" is used as index in the table to record beacon tag that is heard. "J" is used to scan the table, when the tag to be localized is addressed.

At step 1040, the active tag calculates the distance between the active tag (itself) and beacon tags recorded in EPC_TABLE. This calculation was not possible previously as the active tag was not aware about the distance separating itself from the reader.

At step 1045, the record containing the beacon tag EPC (Identification) and T3 (distance between active tag and beacon tag) is appended to EPC_LIST of the active tag. The index in the EPC_TABLE is updated at step 1045, and if the end of table is not reached at step 1050, the process loops on next entry at step 1040.

If all entries of EPC_TABLE have been processed at step 1050, then the active tag sends (in response to the polling) the newly calculated EPC_LIST which maps all beacon tags for which a response has been received by the active tag which contains each of the beacon tag distances from the active tag at 1050.

At step 1090, there is a loss of carrier signal, and the process ends at step 1095 since the active tag is no longer powered.

Figure 8:
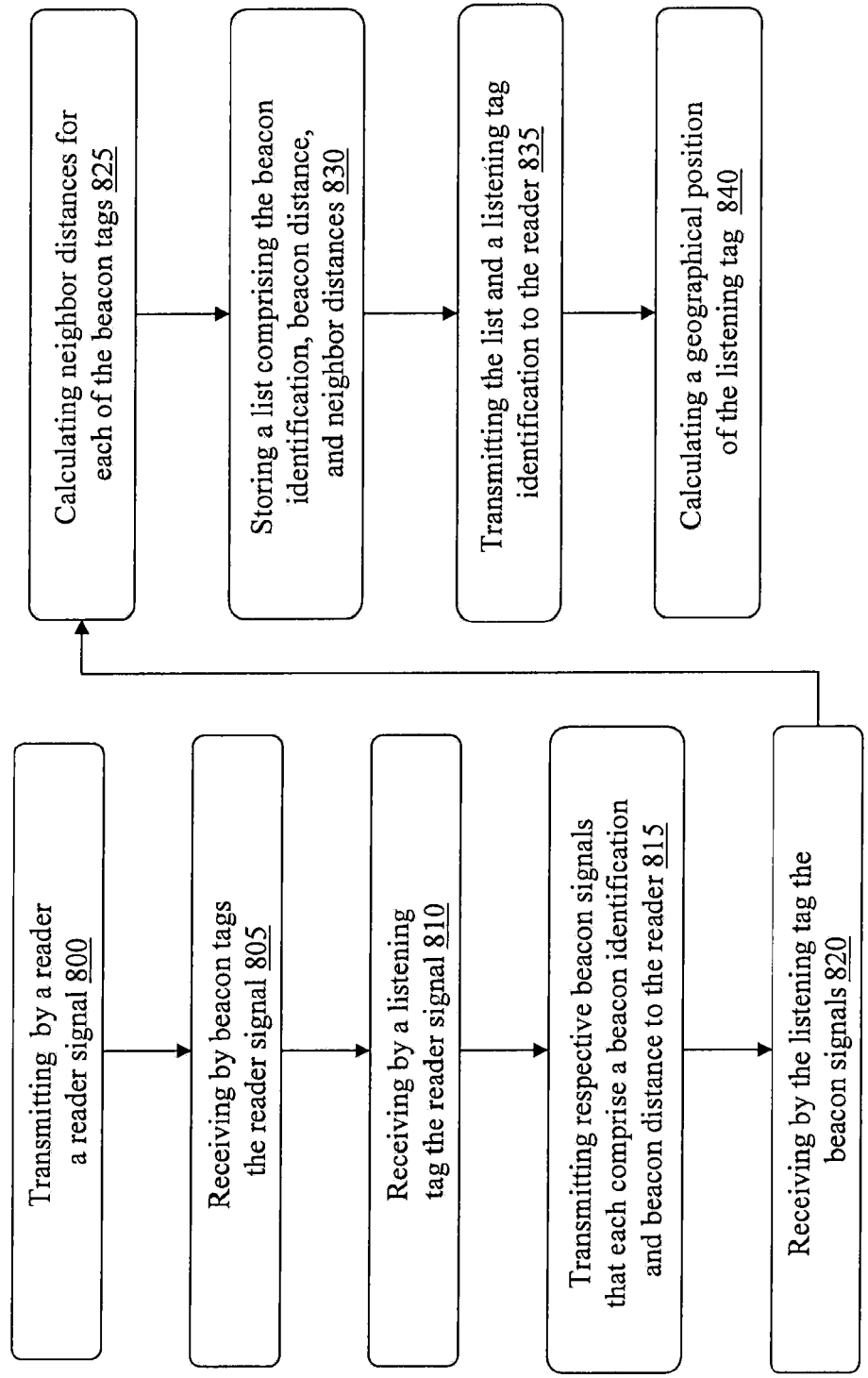
FIG. 8 illustrates a radio frequency identification method for locating a listening tag using beacon tags in accordance with exemplary embodiments.

Now referring to FIG. 8, FIG. 8 illustrates a radio frequency identification method for locating a listening tag using beacon tags in accordance with exemplary embodiments.

A reader transmits a reader signal at 800. The reader signal is received by beacon tags at 805. Also, the reader signal is received by a listening tag at 810.

The beacon tags each transmit a beacon signal, where each of the beacon signals includes a beacon identification and a beacon distance to the reader at 815.

The listening tag receives each of the beacon signals (which can be at different times) at 820. In response to receiving the beacon signals, neighbor distances are calculated for each of the beacon tags based on when each of the beacon signals is received by the listening tag, when the listening tag itself receives the reader signal, and a constant processing time at 825. The neighbor distances are the individual distances from the listening tag to each one of the beacon tags.

A list is stored, where the list includes the beacon identification for each of the beacon tags, the beacon distance to the reader for each of the beacon tags, and the neighbor distances for each of the beacon tags at 830.

The listening tag transmits the list and a listening tag identification to the reader at 835. A geographical position of the listening tag is calculated based on the beacon distance for each of the beacon tags, the beacon coordinates for each of the beacon tags, and a listening tag distance which is a distance from the reader to the listening tag at 840.

In exemplary embodiments, the listening tag may be moving or still. For example, to calculate the geographical position if the listening tag is moving, the distance from the listening tag to at least four beacon tags may be used.

The reader may calculate the geographical position of the listening tag based on trilateration and/or the listening tag may calculate the geographical position of the listening tag based on trilateration.

Trilateration is a technique of determining the relative positions of objects using the geometry of triangles in a similar fashion as triangulation. Unlike triangulation, which uses angle measurements (together with at least one known distance) to calculate the subject's location, trilateration uses the known locations of two or more reference points, and the measured distance between the subject and each reference point. To accurately and uniquely determine the relative location of a point on a 2D plane using trilateration alone, generally at least 3 reference points are needed. Also, a mathematical derivation for the solution of a three-dimensional trilateration problem can be found by taking the formulae for three spheres and setting them equal to each other.

Further, one skilled in the art understands the details of trilateration and can determine the geographical position of the listening tag using trilateration. It is understood that other techniques can be used to calculate the geographical position and exemplary embodiments are not limited to trilateration.

Although many examples have been provided, there are many ways to implement exemplary embodiments. In one implementation, beacon tags do not know their own coordinates. For example, the reader maintains the association between the beacon tags' ID and the beacon tags' coordinates. A searched (listening) tag responds back with distances between itself and all neighbor beacon tags. The reader computes the geographical position of searched (listening) tag.

In another implementation of exemplary embodiments, the beacon tags have their own individual coordinates in memory, and the reader calculates the listening (mobile) tag's coordinates. For example, the reader retrieves coordinates of all beacon tags. The searched (listening) tag responds back with distances between itself and all neighbor beacon tags. The reader computes the geographical position of searched (listening) tag.

In another implementation of exemplary embodiments, the beacon tags have their own individual coordinates in memory and the listening (mobile) tag calculates its own coordinate. For example, the searched listening tag responds back with its coordinates to the reader.

It is understood that features from different implementations and/or examples may be mixed and matched with other features to suit the needs of a user, and implementations are not meant to be limiting.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While exemplary embodiments to the invention have been described, it will be understood that those skilled in the art, both now and in the future, may make various improvements and enhancements which fall within the scope of the claims which follow. These claims should be construed to maintain the proper protection for the invention first described.

What is claimed is:

1. A radio frequency identification method for locating a listening tag using beacon tags comprising:
    transmitting a reader signal by a reader;
    receiving the reader signal by a plurality of beacon tags;
    receiving the reader signal by a listening tag;
    transmitting, respectively by the plurality of beacon tags, a plurality of beacon signals, wherein each of the plurality of beacon signals respectively comprises:
        a beacon identification, and
        a beacon distance to the reader;
    in response to the listening tag receiving the plurality of beacon signals, calculating by the listening tag neighbor distances for each of the plurality of beacon tags based on a combination of:
        a time at which each of the plurality of beacon signals is received by the listening tag;
        a time at which the listening tag receives the reader signal; and
        a constant processing time as a constant value for each of the plurality of beacon tags to receive and to process data of the reader signal before respectively transmitting the plurality of beacon signals;
    wherein, to compute the neighbor distances, the listening tag computes a delay time between the time at which the listening tag receives the reader signal and the time at which the listening tag respectively receives the plurality beacon signals, in order for the listening tag to subtract the constant processing time;
    wherein the neighbor distances are individual distances from the listening tag to each of the plurality of beacon tags;
    storing a list by the listening tag, wherein the list comprises:
        the beacon identification and beacon distance to the reader for each of the plurality of beacon tags; and
        the neighbor distances for each of the plurality of beacon tags as calculated by the listening tag;
    transmitting, by the listening tag, to the reader:
        the list; and
        a listening tag identification;
    calculating a geographical position of the listening tag based on:
        the beacon distance for each of the plurality of beacon tags;
        beacon coordinates for each of the plurality of beacon tags; and
        a listening tag distance which is a distance from the reader to the listening tag.

2. The method of claim 1, wherein the reader calculates the geographical position of the listening tag based on trilateration; and
    wherein the listening tag stores the delay time, between the time at which the listening tag receives the reader signal and the time at which the listening tag respectively receives the plurality beacon signals, in the list.

3. The method of claim 1, wherein the listening tag calculates the geographical position of the listening tag based on trilateration.

4. The method of claim 3, wherein the listening tag transmits the geographical position of the listening tag to the reader.

5. The method of claim 1, wherein the reader knows the beacon coordinates for each of the plurality of beacon tags.

6. The method of claim 1, wherein each of the plurality of beacon tags knows its respective beacon coordinates.

7. The method of claim 6, wherein each of the plurality of beacon signals further comprises beacon coordinates, respectively.

8. The method of claim 7, wherein the list further comprises the beacon coordinates for each of the plurality of beacon tags.

9. The method of claim 1, wherein the reader calculates the listening tag distance.

10. The method of claim 1, wherein the listening tag calculates the listening tag distance.

11. A radio frequency identification system for locating a listening tag using beacon tags, the system comprising:
    a reader configured to transmit and receive, wherein the reader transmits a reader signal;
    a plurality of beacon tags configured to transmit and receive, wherein the plurality of beacon tags receive the reader signal and the plurality of beacon tags respectively transmit a plurality of beacon signals;
    wherein each of the plurality of beacon signals respectively comprises:
    a beacon identification, and
    a beacon distance to the reader;
    a listening tag configured to transmit and receive, wherein the listening tag receives the reader signal and the listening tag receives the plurality of beacon signals, respectively;
    wherein in response to the listening tag receiving the plurality of beacon signals, the listening tag calculates neighbor distances for each of the plurality of beacon tags based on a combination of:
        a time at which each of the plurality of beacon signals is received by the listening tag;
        a time at which the listening tag receives the reader signal; and
        a constant processing time as a constant value for each of the plurality of beacon tags to receive and to process data of the reader signal before respectively transmitting the plurality;
    wherein, to compute the neighbor distances, the listening tag computes a delay time between the time at which the listening tag receives the reader signal and the time at which the listening tag respectively receives the plurality beacon signals, in order for the listening tag to subtract the constant processing time;
    wherein the neighbor distances are individual distances from the listening tag to each of the plurality of beacon tags;
    wherein the listening tag stores a list, the list comprising:
        the beacon identification and beacon distance to the reader for each of the plurality of beacon tags; and
        the neighbor distances for each of the plurality of beacon tags as calculated by the listening tag;
    wherein the listening tag transmits the list and a listening tag identification to the reader;
    wherein a geographical position of the listening tag is calculated based on:

the beacon distance for each of the plurality of beacon tags;
beacon coordinates for each of the plurality of beacon tags; and
a listening tag distance which is a distance from the reader to the listening tag.

12. The system of claim 11, wherein the reader is configured to calculate the geographical position of the listening tag based on trilateration.

13. The system of claim 11, wherein the listening tag is configured to calculate the geographical position of the listening tag based on trilateration.

14. The system of claim 13, wherein the listening tag transmits the geographical position of the listening tag to the reader.

15. The system of claim 11, wherein the reader knows the beacon coordinates for each of the plurality of beacon tags, and the beacon coordinates are stored in memory of the reader.

16. The system of claim 11, wherein each of the plurality of beacon tags knows its respective beacon coordinates, stored in a respective memory of the plurality of beacon tags.

17. The system of claim 16, wherein each of the plurality of beacon signals further comprises beacon coordinates, respectively.

18. A computer program product, tangibly embodied on a non-transitory computer readable medium, for utilizing radio frequency identification to locate a listening tag using beacon tags, the computer program product including instructions for causing a computer to execute a method, comprising:
   transmitting a reader signal by a reader;
   receiving the reader signal by a plurality of beacon tags;
   receiving the reader signal by a listening tag;
   transmitting, respectively by the plurality of beacon tags, a plurality of beacon signals, wherein each of the plurality of beacon signals respectively comprises:
      a beacon identification, and
      a beacon distance to the reader;
   in response to the listening tag receiving the plurality of beacon signals, calculating neighbor distances for each of the plurality of beacon tags based on a combination of:
      a time at which each of the plurality of beacon signals is received by the listening tag;
      a time at which the listening tag receives the reader signal; and
      a constant processing time as a constant value for each of the plurality of beacon tags to receive and to process data of the reader signal before respectively transmitting the plurality of beacon signals;
   wherein, to compute the neighbor distances, the listening tag computes a delay time between the time at which the listening tag receives the reader signal and the time at which the listening tag respectively receives the plurality beacon signals, in order for the listening tag to subtract the constant processing time
   wherein the neighbor distances are individual distances from the listening tag to each of the plurality of beacon tags;
   storing a list by the listening tag, wherein the list comprises:
      the beacon identification and beacon distance to the reader for each of the plurality of beacon tags; and
      the neighbor distances for each of the plurality of beacon tags as calculated by the listening tag;
   transmitting, by the listening tag, to the reader:
      the list; and
      a listening tag identification;
   calculating a geographical position of the listening tag based on:
      the beacon distance for each of the plurality of beacon tags;
      beacon coordinates for each of the plurality of beacon tags; and
      a listening tag distance which is a distance from the reader to the listening tag.

19. The computer program product of claim 18, wherein the reader calculates the geographical position of the listening tag based on trilateration.

20. The computer program product of claim 18, wherein the listening tag calculates the geographical position of the listening tag based on trilateration.

* * * * *